United States Patent [19]

Kubo

[11] Patent Number: 4,563,234
[45] Date of Patent: Jan. 7, 1986

[54] APPARATUS FOR WINDING VIDEO TAPE ON REELS OF A CASSETTE

[75] Inventor: Yoshiharu Kubo, Tokushima, Japan

[73] Assignee: Awa Engineering Co., Ltd., Tokushima, Japan

[21] Appl. No.: 622,058

[22] Filed: Jun. 15, 1984

Related U.S. Application Data

[63] Continuation-in-part of Ser. No. 450,544, Dec. 16, 1982, abandoned.

[30] Foreign Application Priority Data

Dec. 17, 1981 [JP] Japan ................... 56-205792

[51] Int. Cl.[4] .................. B31F 5/00; G03D 15/04
[52] U.S. Cl. ................... 156/505; 156/502; 156/506; 156/157; 156/159; 242/58.2; 242/58.4
[58] Field of Search .............. 156/502, 505, 506, 157, 156/159; 242/58.4, 58.2, 58.1, 58.5

[56] References Cited

U.S. PATENT DOCUMENTS

| | | |
|---|---|---|
| 3,654,035 | 4/1972 | Takimoto ..................... 156/505 |
| 3,917,184 | 11/1975 | King ........................... 156/507 |
| 3,997,123 | 12/1976 | King ........................... 156/502 |
| 4,065,067 | 12/1977 | Martinez ..................... 242/58.1 |
| 4,143,776 | 3/1979 | Meyers et al. ............... 414/567 |

Primary Examiner—Edward Kimlin
Assistant Examiner—Merrell C. Cashion, Jr.
Attorney, Agent, or Firm—Wenderoth, Lind & Ponack

[57] ABSTRACT

An apparatus for winding video tape on reels of a cassette includes a winding device for winding video tape on the reels and a feeding device for feeding a pair of reels to the winding device, the winding device having two shafts on which two reels can be removably mounted, at least one of the shafts being movable in a direction away from the other, a connecting member for connecting tapes being provided so as to be brought in and out of the path of movement of the movable shaft, the connecting member being out of the path of the reels when the reels are being moved away from each other, and when the reels are spaced from each other, the connecting member is moved in and out of the space between the reels so as to connect the tape wound on the reels with video tape.

2 Claims, 18 Drawing Figures

APPARATUS FOR WINDING VIDEO TAPE ON REELS OF A CASSETTE

BACKGROUND OF THE INVENTION

The present invention relates to an apparatus for winding video tape on reels of a cassette.

An apparatus for winding a long tape on reels of a video tape cassette and cutting a given length of the tape has been in actual use. However, in a conventional apparatus of this kind, although the tape is automatically wound and cut, reels cannot be automatically mounted on the winding apparatus, but rather they are manually mounted one by one. Therefore, the winding operation requires much manual labor.

Since video tape cassettes are produced and sold on a large scale, it is very important that the winding be carried out with high efficiency and a small number of workers.

Further, it is convenient that a pair of reels wound with video tape be transferred while they are positioned close to each other, both when they are directly set into a cassette case by the winding means and when they are mounted on a tray and transferred.

Usually, when a pair of reels is placed close to each other, a short reel tape preliminarily wound on the reels extends between them and the video tape to be wound on the reels is connected to this short reel tape, and then the rear end of the video tape is cut and connected with the reel tape.

However, it is disadvantageous that such operation of the mechanism is apt to lack sureness, take too much time and the efficiency is low.

An object of the present invention is to provide an apparatus for winding video tape on the reels of a cassette which are spaced from each other and by which the video tape to be wound is connected to the reels easily, surely and efficiently, and further in which there is provided a mechanism for removing a member for connecting the video tape out of the path of the reels being transferred relative to the apparatus so that the reels can be transferred rapidly and efficiently.

BRIEF SUMMARY OF THE INVENTION

Examples of the present invention will be described below with reference to the appended drawings, in which.

DETAILED DESCRIPTION OF THE INVENTION

Figure 1:
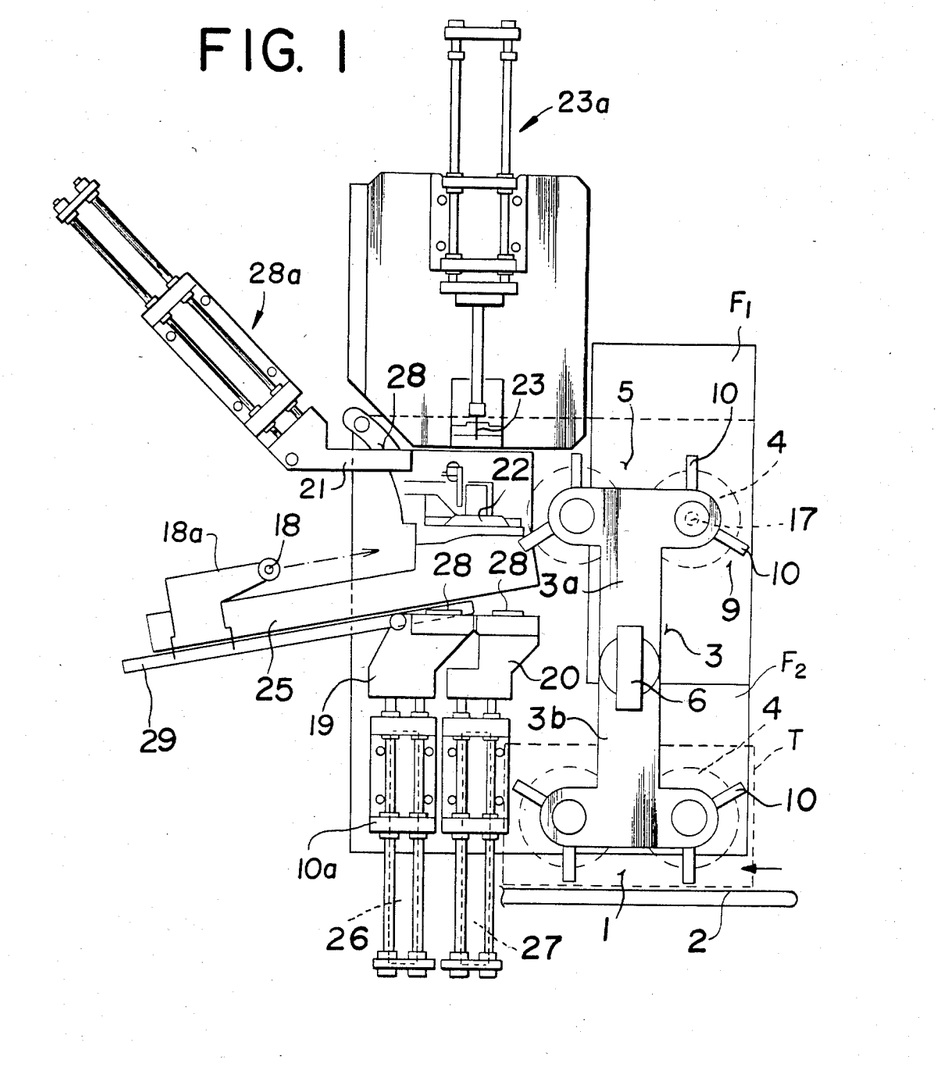
FIGS. 1 and 2 are a front view and a partial side view of an example of an apparatus for winding video tape on reels of a cassette according to the present invention.
Figure 2:
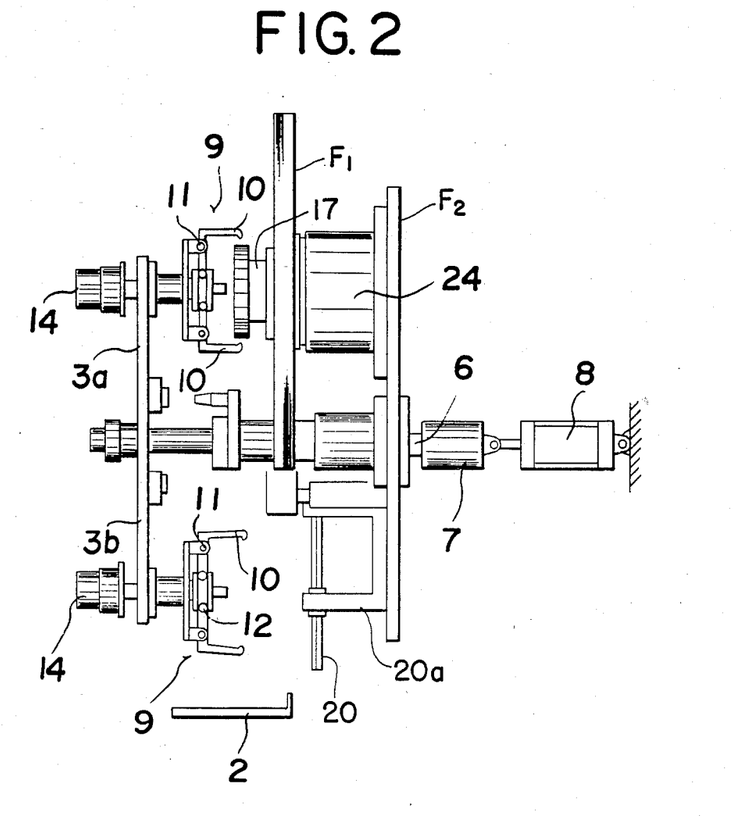

The apparatus for winding video tape on reels of a cassette shown FIGS. 1 and 2 is comprised of a transfer means which has a feeding means and a rotating arm means, and a winding means.

The feeding means is a conveyor 2 which carries a tray T on which reels 4 are removably mounted to a transfer position 1, which is both a loading and unloading position, and away from said position, the tray being carried while in the upright state.

The rotating arm means comprises a rotating arm 3 rotatably mounted around the axis of a shaft 6 equally spaced from the transfer position 1 and a winding position 5, and a shaft 6 on which arm 3 is mounted for rotation in the plane including the transfer position 1 and the winding position 5 i.e. in a vertical plane in FIGS. 1 and 2. With this construction, when the rotating arm 3 rotates through 180 degrees, the reels 4 in the transfer position 1 are transferred to the winding position 5 and the reels 4 in the winding position 5 are transferred to the transfer position 1.

The shaft 6 of the rotating arm 3 is connected to a motor-reduction gear means 7 for rotating the shaft in increments at a pitch of 180 degrees. The shaft 6 is reciprocally axially displacable in frame members $F_1$ and $F_2$ by a piston-cylinder device 8 so as to remove reels held by holding members 9 on the arm 3 from the winding means, described hereinafter, and the tray T and then after the arm 3 is rotated, to remount the reels on the winding means and the tray.

The arm 3 has arm portions 3a and 3b extending radially from the shaft 6. The arm portions 3a and 3b are equal in length and have a pair of holding members 9 at the respective outer ends thereof.

Figure 3:
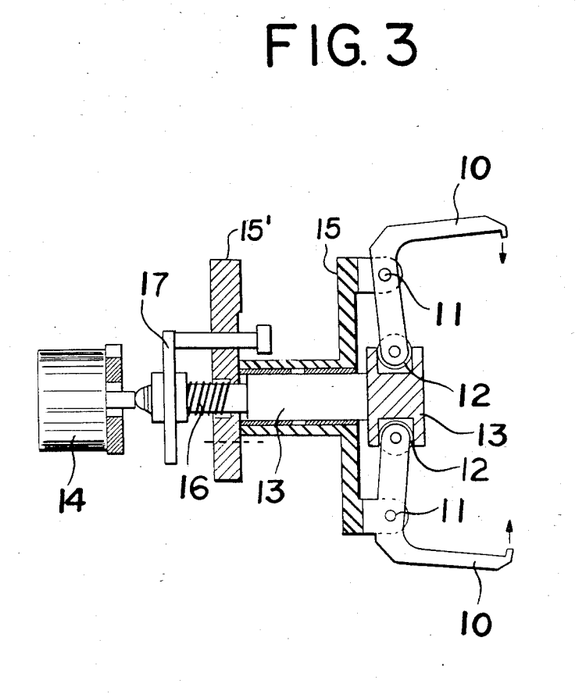
FIG. 3 is an enlarged sectional view of a reel holding used in the apparatus of FIGS. 1 and 2.

Each holding member 9 comprises, as shown in FIG. 3, a plurality of clamping arms 10 spaced around the axis thereof which clamp the reel 4 from at least three directions. The clamping arms 10 are each L shaped and rotatably mounted on a pin 11 adjacent the bent portion on a support 15, and are each provided with a roller 12 at the end near the axis of the holding member.

Each roller 12 is positioned in a groove provided in the end of a reciprocating shaft 13 is movable along the axis of the holding member by a piston-cylinder device 14 against the action of a spring 16 and guided by guide rod 17 slideable through an opening in support portion 15'. When the reciprocating shaft 13 is pushed rightwardly in FIG. 3, the clamping arms 10 are opened, and upon retraction of the piston-cylinder device, the reciprocating shaft 13 is pushed leftwardly by the coil spring 16. Thus the clamping arms 10 grasp and release a reel.

The winding means is used for winding a given length of tape on each of a pair of reels 4 transferred to the winding position 5. The winding means comprises two shafts, a fixed shaft 17 on frame $F_1$ and a movable shaft 18, vertically movable supports 19 and 20 which are connecting members, a magnetic tape table 21, a tape table 22 and a cutter 23, the operation of which is shown in FIGS. 4 to 17.

The fixed shaft 17 is positioned at the location of the rotational axis of a reel 4 carried on the rotating arm 3 when it is on the righthand side of the winding position 5, and shaft 17 is rotated by a motor 24 mounted on frame $F_2$ and winds a given length of video tape on the reel 4 mounted on the fixed shaft 17 by the action of the rotating arm means and a holding member 9.

The movable shaft 18 is mounted in a shaft holder 18a which in turn is slideably mounted on a guide 25 so as to be movable toward and away from a position spaced laterally to the left of the fixed shaft 17 in FIG. 1 a distance equal to the spacing between a pair of reels on the arm 3, and the holder 18a is connected to a piston-cylinder device 29 for being displaced along guide 25 thereby.

The vertically movable supports 19 and 20 are mounted on the piston rods of piston-cylinder devices 26 and 27 mounted on brackets 19a and 20a in frame F₂ so that they are independently movable across the path of the shaft 18. On the upper end surfaces of the vertically movable supports 19 and 20 are air suction ports 28 constituting means for holding the video tape thereagainst by suction.

In the upper surface of the magnetic tape table 21 is provided an air suction port constituting means for holding video tape thereagainst by suction. The magnetic tape table 21 is disposed above the lefthand vertically movable support 19 and along a diagonal line downwardly to the right and upwardly to the left by a piston-cylinder means 28a.

The adhesive tape table 22 is disposed above the space between the two vertically movable supports 19 and 20 and is movable in the vertical direction. The adhesive tape table 22 comprises means for attaching an adhesive tape to the upper surface of the tape held on the vertically movable supports 19 and 20.

The cutter 23 is positioned above the movable supports 19 and 20 in a position to cut the tape held by the vertically movable supports 19 and 20 at the point between the two vertically movable supports 19 and 20. For this purpose, the cutter 23 is provided just above the space between the two vertically movable supports 19 and 20 and is movable in the vertical direction by piston-cylinder means 23a.

The operation of the apparatus for winding tape on reels comprises a repetition of the following steps.

Figure 4:
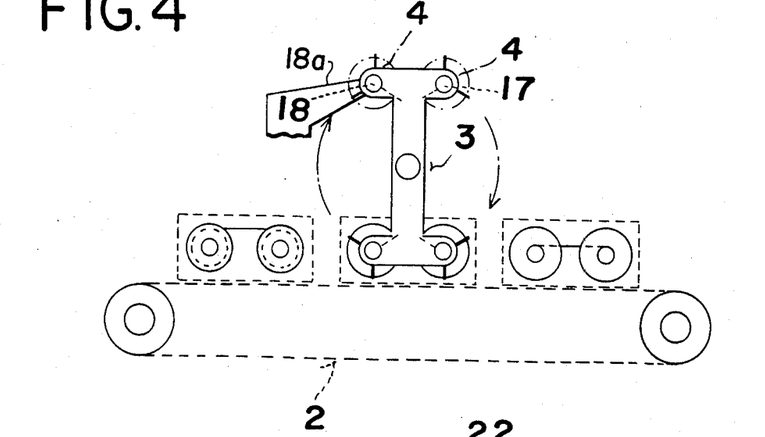
FIGS. 4 to 17 are schematic sectional views showing the process of winding video tape on the reels.

(1) As shown in FIG. 4, with the holder 18a moved to the rightmost position in FIG. 1 to position movable shaft 18 in the position spaced laterally to the left of fixed shaft 17, as described above, two reels in a set are mounted on the fixed shaft 17 and the movable shaft 18 respectively by means of holding members 9 on rotating arm 3, the arm rotating into the FIG. 4 position with the holding members 9 carrying reels 4 from a tray T and then moving toward the shafts 17 and 18 by the piston-cylinder device 8 to place the reels on the shafts after which the holding members are operated to release the reels and the arm 3 is moved back away from shafts 17 and 18.

Figure 5:
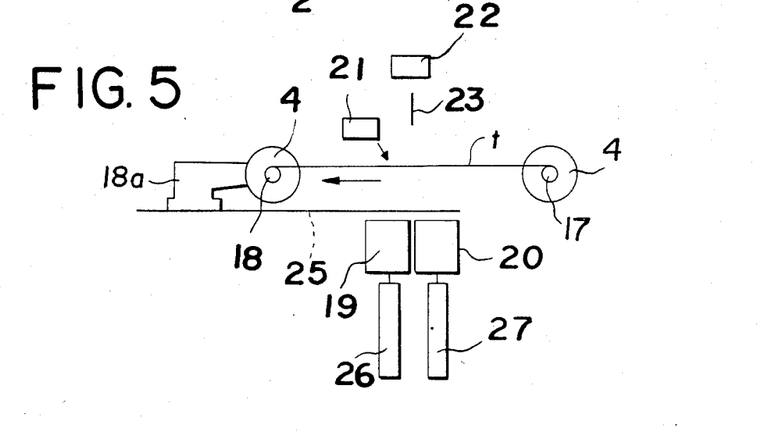

(2) Then, as shown in FIG. 5, the movable shaft 18 is displaced leftwardly along the guide 25 and unwinding a short tape t previously wound on the reels 4, as is conventional.

At this time, the vertically movable supports 19 and 20 are in the lower position and the magnetic tape table 21, cutter 23 and the adhesive tape table 22 are in the upper positions.

Figure 6:
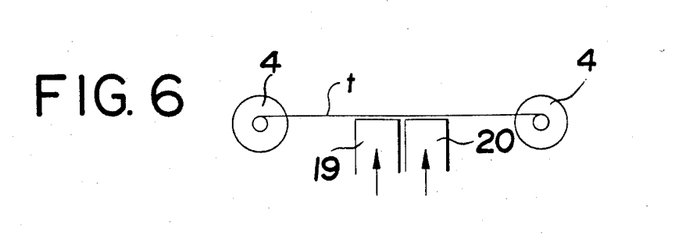

(3) As shown in FIG. 6, the two vertically movable supports 19 and 20 are moved upwardly to contact the short tape t and hold the tape by suction.

Figure 7:
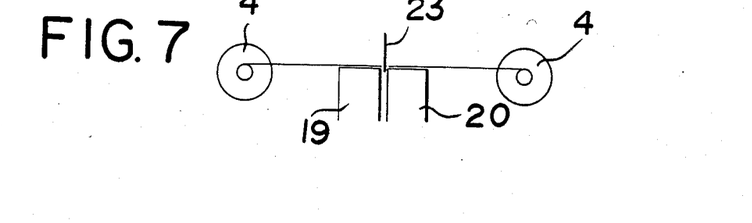

(4) While the tape t is thus held, as shown in FIG. 7, the cutter 23 is moved down and cuts the tape at the point between the two vertically movable supports 19 and 20 and then moves back up.

Figure 8:
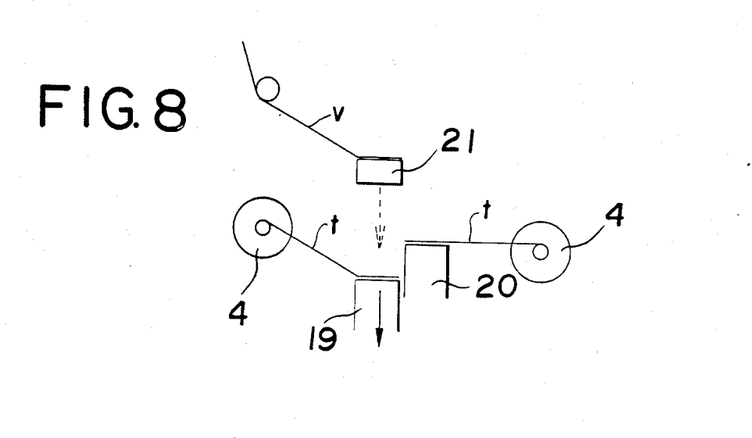
Figure 9:
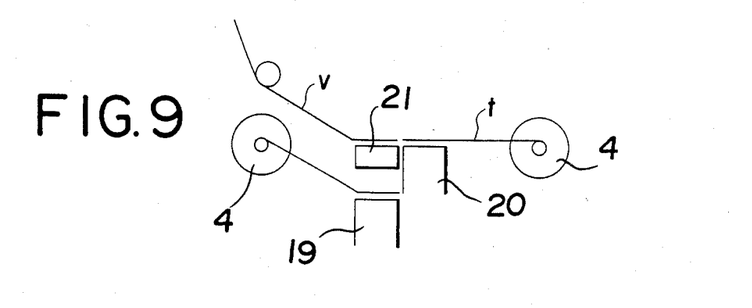

(5) Next, as shown in FIGS. 8 and 9, only the lefthand vertically movable support 19 is moved down, and the magnetic tape table 21 with the end of the video tape v to be wound onto the reels held on the upper surface thereof by suction moves down until the upper surface is in the same plane as the upper surface of the righthand vertically movable support 20.

Figure 10:
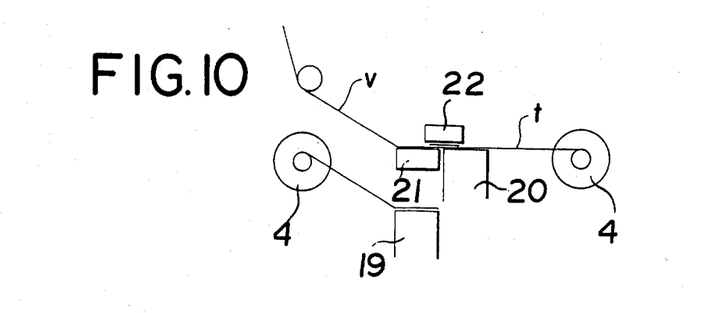

(6) Next the adhesive tape table 22 is moved down and adheres a piece of adhesive tape ta to the end of the short tape t to the end of the video tape v to connected the video tape v and the short tape t.

Figure 11:
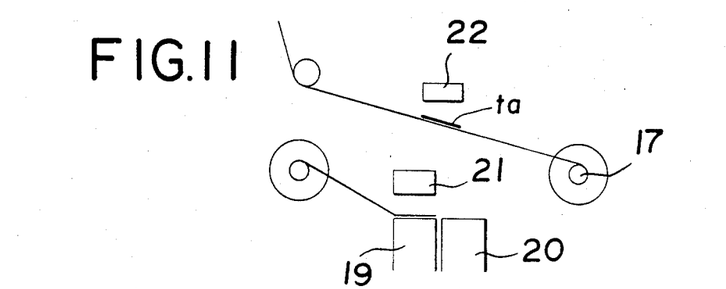

(7) The adhesive tape table 22 is then moved up as shown in FIG. 11, and the two vertically movable supports 19 and 20 and the magnetic tape support 21 are moved down so that they are spaced from the tape.

Figure 12:
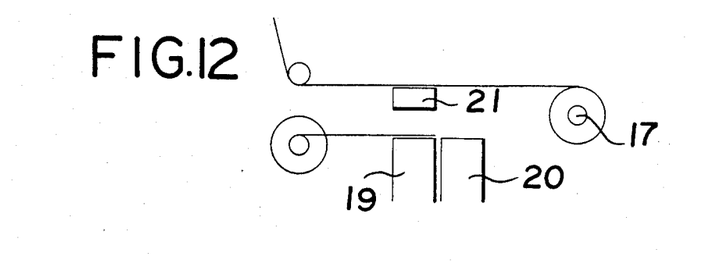

(8) The fixed shaft 17 is rotated to wind the video tape onto the reel 4 on the fixed shaft 17, as shown in FIG. 12.

Figure 13:
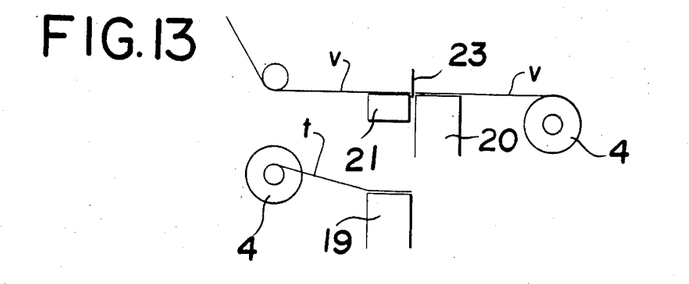

(9) When the desired length of video tape has been wound on the reel mounted on the fixed shaft 17, the fixed shaft 17 is stopped, and as shown in FIG. 13 the magnetic tape table 21 and the righthand vertically movable support 20 are moved up and hold the video tape v by suction. The cutter 23 is again moved down and cuts the video tape.

Figure 14:
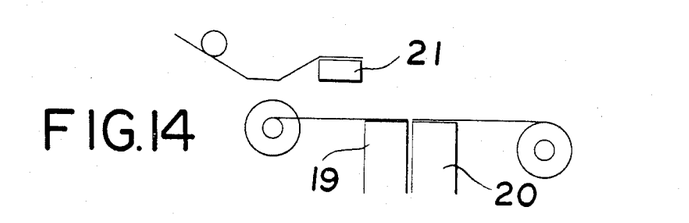

(10) As shown in FIG. 14, the cutter 23 is then moved up, the magnetic tape table 21 is moved up, and the lefthand vertically movable support 20 which has been holding the short tape t is also moved up until it is level with the righthand vertically movable support 20.

Figure 15:
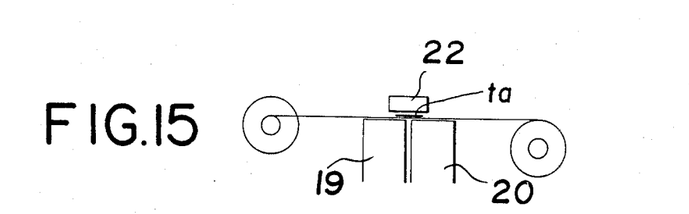

(11) As shown in FIG. 15, the adhesive tape table 22 is again moved down and adheres a piece of adhesive tape ta to the ends of the short tape t and video tape v held by the movable supports for connecting the short tape t to the rear end of the video tape v.

Figure 16:
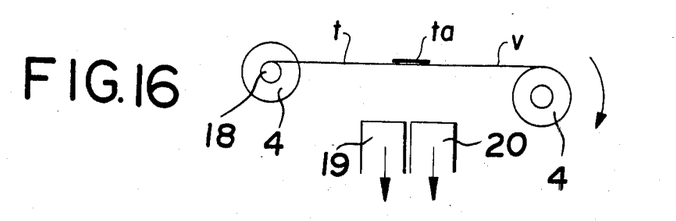

(12) The two vertically movable supports 19 and 20 are then moved down away from the path of movement of the movable shaft 19 as shown in FIG. 16.

Figure 17:
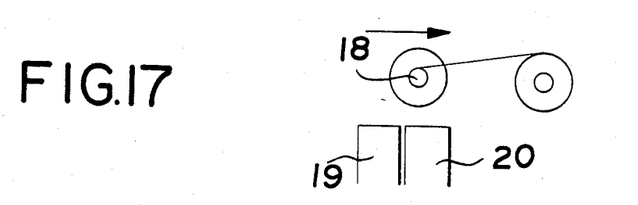

(13) Finally, as shown in FIG. 17, the fixed shaft 17 is rotated to wind the tape therearound and the holder 18a is moved along guide 25 to move the movable shaft 18 toward the fixed shaft 17 until the two reels are in position to be clamped by the clamping arms 10 of the holding members 9 on the rotating arm 3. The rotating arm 3 then moves toward the shafts 17 and 18 and the holding members are operated to clamp the reels, and the arm 3 is then moved away from the shafts 17 and 18 carrying the reels on which the tape has been wound. Rotation of arm 3 moves the full reels to the transfer position 1, and also transfers empty reels from the transfer position to the winding position 5.

The operations of items (1) to (13) are repeated to wind the video tape on the empty reels.

The details of the operation of the rotating arm 3 for conveying the reels from the transfer position 1 to the winding position 5 and back are as follows.

(14) A tray on which two reels are mounted is carried by the conveyor 1 in the upright position to the transfer position 1. At this time, as shown in FIGS. 2 and 3, the piston-cylinder device 8 has the piston rod out and the shaft 6 of the rotating arm 3 is displaced leftwardly.

(15) The shaft 6 is displaced rightwardly by the operation of piston-cylinder device 8. At this time, the piston of the piston-cylinder device 14 is out, and the reciprocating shaft 13 is displaced rightwardly and the clamping arms are open.

After the piston rod of the cylinder 8 is retracted, the piston rod of the piston-cylinder device 14 is retracted and the clamping arms 10 are pivoted so as to grip the two reels on the tray.

(16) The piston rod of the piston-cylinder device 8 is pushed out and the shaft 6 is displaced leftwardly. Then, the drive motor-reduction gear means 7 is driven and the shaft 6 is rotated through 180°, whereby the reels are transferred to the winding position.

(17) The piston rod of the piston-cylinder device 8 is retracted and the two reels carried by the holding member 9 are mounted on the fixed shaft 17 and the movable shaft 18.

(18) The piston rod of the piston-cylinder device 14 is pushed out to pivot clamping arms 10 to release the reel. Then, the rod of the piston-cylinder device 8 is pushed out and the shaft 6 is displaced leftward.

The above-described operation is that which is carried out when no reels are in the winding position 5. If reels on which the video tape has been already wound are in the winding position 5 and empty reels are in the transfer position 1, the operation comprises the following steps.

(19) After step 14 as described above, with clamping arms 10 on the holding members on both ends of the rotating arm 3 open, the piston rod of the cylinder is retracted and then the piston rod of the piston-cylinder devices 14 on both ends of the arms is retracted, whereby the clamping arms 10 on the upper end of arm 3 clamp the two reels in the winding position 5, while the clamping arms 10 on the lower end of the arm 3 clamp the two empty reels in the transfer position 1.

(20) The piston rod of piston-cylinder device 8 is pushed out to move the reels in the winding position 5 off the shafts 17 and 18 and the empty reels out of the tray T. Then the shaft is rotated through 180 degrees whereby the empty reels are transferred to the winding position 5 and the reels on which the tape has been wound are transferred to the transfer position 1.

(21) The piston rod of the piston-cylinder device 8 is retracted to mount the empty reels on shaft 17 and 18 and the tape-containing reels in the tray T, and the piston rods of the piston-cylinder devices 14 are pushed out, whereby the clamped reels are released. Then the piston rod of the piston-cylinder device 8 is pushed out to move the arm 3 away from the reels. Thus the reels on which the tape has been wound are transferred to the transfer position and loaded in the trays, and the empty reels are transferred to the winding position and put on shafts 17 and 18.

The operations (19)–(21) are repeated so that the reels are continuously exchanged between the transfer and winding positions.

In the apparatus shown in FIGS. 1 and 2, the position for unloading and the position for loading the trays is the same, i.e. the transfer position, and the rotating arm 3 has two arm portions extending in radially opposite directions. With the rotation of this rotating arm 3 through 180 degrees, the reels are unloaded and loaded.

Figure 18:
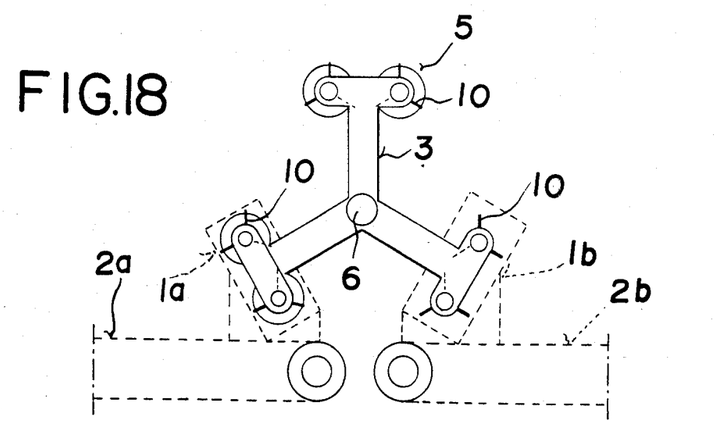
FIG. 18 is a schematic front view of another example of the apparatus for winding video tape on reels of a cassette according to the present invention.

FIG. 18 shows an example of the present invention in which the unloading position 1a, loading position 1b and the winding position 5 are located around the shaft 6 of the rotating arm 3 so as to be equally spaced from the shaft 6 and at a pitch of 120 degrees.

The rotating arm 3 has three arm portions each of which is provided at the outer end with a holding member 9 having clamping arms 10 for clamping reels. The transfer means is constituted by a feeding conveyor 2a and a discharge conveyor 2b. Mechanisms for rotating the rotating arm 3, for displacing the shaft 6 of the rotating arm 3 and for driving the clamping arms 10 can be the same as those used in the example shown in FIGS. 1 and 3. In this example, however, the rotating arm 3 is rotated at a pitch of 120 degrees.

In the operation of this apparatus, each time the rotating arm 3 is rotated through 120 degress, the reels in the winding position 5 are transferred to the unloading position 1a and the reels in the loading position 1a are transferred to the winding position 5.

The advantage of this construction is that the loading and unloading of the reels can be separately carried out.

EFFECTS

In the apparatus for winding video tape on reels of a cassette according to the present invention and having the above-described construction, video tape is not connected with the two reels while the reels are being held in positions spaced from each other the same as when they are contained in the cassette. The space between the two reels is kept short while they are being transferred to thereby increase the transfer efficiency. On the other hand, during the process of winding the video tape onto the reels, the two reels are spaced at a greater distance than when they are in the cassette, so that a tape connecting member can be interposed therebetween and the tapes can be connected. Consequently, the tapes can be connected easily, surely and rapidly. Further, when the reels are transferred, the connecting member is displaced out of the path of the reels and is moved into and out of the space between the reels for connecting the tapes. Thus the mechanism for displacing the reels can be remarkably simplified, and the tape wound on the reels is prevented from sliding or being removed. It is very advantageous that the tape winding is stabilized and poor products and wrong operation of the mechanism can be substantially completely eliminated.

What is claimed:

1. An apparatus for winding tape on a pair of reels to be inserted into a cassette, said apparatus comprising:
a pair of winding shafts for receiving reels onto which the tape is to be wound, at least one of said shafts being movable from a first position adjacent and laterally spaced from the other shaft a distance substantially the same as the reels are spaced in the cassette to a second position spaced a substantial distance from other said shaft, and means for driving said other shaft;
feeding means for picking up a pair of empty reels spaced from each other a distance substantially the same as the reels are spaced in the cassette and, while said one shaft is in said first position, mounting said empty reels on said shafts, and for, after the tape has been wound on the reels, removing the reels from said shafts;
a guide extending from adjacent said first position to a position adjacent said second position and a shaft holder having said one shaft thereon movably mounted on said guide for movement therealong for moving said one shaft reciprocally between said one position and said second position; and
a tape connecting means positioned between said first and second positions and having tape holding means, supply means for tape to be wound, tape cutting means, and tape adhering means all of said means being movable into and out of the path of movement of said one shaft between said first and second positions for moving into the path of movement of said one shaft and holding a short tape extending between the reels when the one shaft is in said second position, cutting the short tape, connecting a tape to be wound on the reels to the short tape coming from the reel on the other shaft, and after said driving means for the other shaft has driven the other shaft to wind the desired amount of tape on the reel on the other shaft, cutting the tape being wound, connecting the end of the tape being wound to the short tape from the reel on said one shaft, and moving out of the path of movement of said one shaft to permit said one shaft to move back to said first position.

2. An apparatus as claimed in claim 1 in which said tape holding means comprises a pair of side-by-side movable supports individually separately movable transversely to the path of movement of said one shaft from a position outside said path to a position in said path and having suction means thereon for holding a tape thereto, said supply means for tape to be wound is a tape table having suction means therein for holding the end of a tape to be wound and movable from outside the path of movement of said one shaft on the opposite side from said tape holding means into said path of movement, said tape cutting means comprises a cutter movable from outside the path of movement of said one shaft into said path in alignment with the space between said movable supports, and said tape adhering means is an adhesive tape table movable from outside the path of movement of said one shaft into said path in alignment with the space between said movable supports for dispensing a piece of adhesive tape for connecting ends of tape held on said movable supports.

* * * * *